United States Patent [19]
Kleiner

[11] Patent Number: 6,063,850
[45] Date of Patent: May 16, 2000

[54] FLAME-RETARDANT THERMOPLASTIC MOLDING COMPOSITIONS COMPRISING ALUMINUM HYDROXIDE

[75] Inventor: Hans-Jerg Kleiner, Kronberg, Germany

[73] Assignee: Ticona GmbH, Germany

[21] Appl. No.: 09/183,009

[22] Filed: Oct. 30, 1998

[30] Foreign Application Priority Data

Oct. 31, 1997 [DE] Germany .......................... 197 48 382

[51] Int. Cl.$^7$ ...................................... C08J 3/10
[52] U.S. Cl. ........................................... 524/437; 524/539
[58] Field of Search ..................... 524/437, 539

[56] References Cited

U.S. PATENT DOCUMENTS

| | | | |
|---|---|---|---|
| 3,864,433 | 2/1975 | Tatsukami et al. ..................... | 525/197 |
| 4,373,067 | 2/1983 | Dieck et al. ............................. | 525/146 |
| 5,500,480 | 3/1996 | Brown et al. ........................... | 524/437 |
| 5,777,018 | 7/1998 | Imahashi ................................ | 524/397 |
| 5,859,412 | 1/1999 | Yagi ....................................... | 219/704 |

OTHER PUBLICATIONS

Murphy, Additives for Plastics Handbook, Elsevier, pp. 123 and 216, 1996.

*Primary Examiner*—David W. Wu
*Assistant Examiner*—Ling-Siu Choi
*Attorney, Agent, or Firm*—Connolly Bove, Lodge & Hutz LLP

[57] ABSTRACT

The present invention relates to a flame-retardant thermoplastic molding composition obtained by treating a mixture containing from 60 to 90% by weight of a thermoplastic polyester and from 10 to 40% by weight of aluminum hydroxide at from 230 to 330° C. under subatmospheric pressure, where from 0.9 to 1.2 mol of water is removed per mole of aluminum hydroxide used.

21 Claims, No Drawings

FLAME-RETARDANT THERMOPLASTIC MOLDING COMPOSITIONS COMPRISING ALUMINUM HYDROXIDE

Thermoplastic polyester molding compositions are used in many different sectors, e.g. in the automotive sector, for producing housings, in particular for electrical devices, and in the building and hygiene sectors.

Many applications require the thermoplastic polyester molding compositions to be flame-retardant. Conventional cost-effective flame retardants such as aluminum hydroxides, which do not impair the pale intrinsic color of the molding compositions, have hitherto been regarded as unsuitable since they become unstable when the molding compositions are processed. For example, S. M. Aharoni in Journal of Applied Polymer Science, Vol. 29, pp. 853 ff. (1984) and EP-A-0,543,262, reports that water is eliminated at the processing temperature of the molding composition. On the one hand this water impairs the shaping process, and on the other hand it causes hydrolytic degradation of the molecular weight of the thermoplastic polyester.

There was therefore a need for thermoplastic polyester molding compositions which on the one hand comprise cost-effective flame retardants based on aluminum hydroxides and on the other hand do not undesirably eliminate water when the polyester molding composition is subsequently processed.

Surprisingly, it has now been found that a thermoplastic polyester molding composition comprising aluminum hydroxide and not having the abovementioned disadvantages is obtained if a mixture of from 60 to 90% by weight of a thermoplastic polyester with from 10 to 40% by weight of aluminum hydroxide is treated at from 230 to 330° C. under subatmospheric pressure, where from 0.9 to 1.2 mol of water is eliminated and removed per mole of aluminum hydroxide used.

The present invention provides a thermoplastic polyester molding composition comprising aluminum hydroxide and obtainable by treating a mixture comprising from 60 to 90% by weight of a thermoplastic polyester and from 10 to 40% by weight of aluminum hydroxide at from 230 to 330° C. under subatmospheric pressure, where from 0.9 to 1.2 mol of water is removed per mole of aluminum hydroxide used.

The thermoplastic polyesters for the purposes of the present invention are known per se. It is preferable to use polyesters which contain an aromatic ring in their main chain. The aromatic ring may also have substituents, e.g. halogens, such as chlorine, bromine and fluorine and/or $C_1$–$C_4$-alkyl groups, such as methyl, ethyl, n-propyl, isopropyl, n-butlyl, isobutyl and tert-butyl groups.

The polyesters may be prepared by reacting dicarboxylic acids or their esters or other ester-forming derivatives with dihydroxy compounds in a manner known per se.

Examples of dicarboxylic acids which may be used are aliphatic or aromatic dicarboxylic acids, which may also be used as a mixture. Mention may be made here, merely as examples, of naphthalenedicarboxylic acids, terephthalic acid, isophthalic acid, adipic acid, azelaic acid, sebacic acid, dodecanedioc acid and cyclohexanedicarboxylic acids, mixtures of these carboxylic acids and ester-forming derivatives of the same.

The dihydroxy compounds used are preferably diols having from 2 to 10 carbon atoms, particularly preferably ethylene glycol, 1,3-propanediol, 1,4-butanediol, 1,4-butenediol and 1,6-hexanediol; however, it is also possible to use 1,4-hexanediol, 1,4-cyclohexanediol, 1,4-di(hydroxymethyl)cyclohexane, bisphenol A, neopentyl glycol, mixtures of these diols or ester-forming derivatives of the same.

Particular preference is given to polyesters made from terephthalic acid or naphthalenedicarboxylic acids and from a $C_2$–$C_6$-diol component, e.g. polyethylene terephthalate, polyethylene naphthalate, polypropylene terephthalate or polybutylene terephthalate or mixtures of these.

It is, of course, also possible to use polyester block copolymers, such as copolyetheresters. Products of this type are known per se and are described in the literature, e.g. in U.S. Pat. No. 3 651 014. Corresponding products are also obtainable commercially, e.g. Hytrel® (DuPont).

The aluminum hydroxide used for the purposes of the invention is a naturally occurring or synthetic aluminum hydroxide $Al(OH)_3$. Examples of these are $\gamma$-$Al(OH)_3$, such as gibbsit or hydrargillite, $\alpha$-$Al(OH)_3$, such as byerite, and also mixtures of these. Preference is given to the use of commercially available aluminum hydroxide. A suitable quality can be purchased, for example, from Riedel-de-Haen under item number 11033.

Besides the thermoplastic polyesters and the aluminum hydroxide, the novel molding compositions may comprise from 0 to 2% by weight of flourine-containing ethylene polymers. These are polymers of ethylene with a fluorine content of from 55 to 76% by weight, preferably from 70 to 76% by weight.

Examples of these are polytetrafluorethylene (PTFE), tetrafluorethylene-hexafluoropropylene copolymers and tetrafluorethylene copolymers with relatively small proportions (generally up to 50% by weight) of copolymermizable ethylenically unsaturated monomers. These are described, for example, by Schildknecht in "Vinyl and Related Polymers", Wiley-Verlag 1952, pp. 484–494 and by Wall in "Fluorpolymers" (Wiley Interscience, 1972).

These fluorine-containing ethylene polymers are present homogeneously distributed in the molding composition and preferably have a particle size $d_{50}$ (numeric median) in the range from 0.05 to 10 μm, in particular from 0.1 to 5 μm.

The novel thermoplastic molding compositions may moreover comprise from 0 to 40% by weight of fibrous or particulate fillers or mixtures of these, which of course are not aluminum hydroxide. These are generally conventional additives and processing aids, such as stabilizers, oxidation inhibitors, agents to protect against thermal decomposition, colorants, such as dyes and pigments, fibrous and pulverulent fillers, fibrous and pulverulent reinforcing agents, nucleating agents, crystallization accelerators, plasticizers, etc.

Examples of oxidation inhibitors and heat stabilizers are halides of metals of Group I of the Periodic Tables, e.g. halides of sodium, of potassium and/or of lithium, if desired in combination with copper(l) halides, e.g. chlorides, bromides or iodides, or are sterically hindered phenols, hydroquinones, aromatic secondary amines, such as diphenylamines, various substituted representatives of these classes and mixtures thereof in concentrations of up to 1% by weight, based on the weight of the thermoplastic molding composition.

UV stabilizers which may be mentioned, and are generally used in amounts of up to 2% by weight, based on the molding composition, are various substituted resorcinols, salicylates, benzotriazoles and benzophenones.

Other possible additives are colorants, such as organic dyes, e.g. nigrosin, pigments, e.g. titanium dioxide, and cadmium selenide, phthalocyanines, ultramarine blue and carbon black, and also fibrous and pulverulent fillers and reinforcing agents. Examples of the latter are carbon fibers, glass fibers, amorphous silica, asbestos, calciumsilicate (wollastonite), aluminum silicate, magnesium carbonate, kaolin, chalk, powdered quartz, mica and feldspar. The proportion of such fillers and colorants is generally up to 40% by weight, preferably up to 30% by weight, in particular up to 25% by weight.

Examples of nucleating agents which may be used are talc, calcium fluoride, sodium phenylphosphinate, alumina and finely divided polytetrafluoroethylene.

Examples of crystallization accelerators which may be used are mentioned in EP-A-0,214,581.

Examples of plasticizers which may be mentioned are dioctyl phthalate, dibenzyl phthalate, butyl benzyl phthalate, hydrocarbon oils, N-(n-butyl)benzenesulfonamide and o- and p-tolylethylsulfonamide.

To improve compatibility with the thermoplastic polyester, minerals and fillers are, if desired, provided with a coupling agent. Preference is given to glycidyl-, vinyl- and aminoalkyltrialkoxysilanes.

The novel thermoplastic molding compositions may also comprise from 0 to 60% by weight, preferably from 0 to 40% by weight, of an impact-modified polymer (below also termed an elastomeric polymer or elastomer).

Preferred types of such elastomers are ethylene-propylene (EPM) rubbers and ethylene-propylen-diene (EPDM) rubbers.

EPM rubbers generally have virtually no residual double bonds, whereas EPDM rubbers may have from 1 to 20 double bonds per 100 carbon atoms.

Examples of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadiene, cyclooctadiene and dicyclopentadiene, and also alkenylnorbornenes, such as 5-ethylidene-2-norbornene, 5-butylidene-2-norbornene, 2-methallyl-5-norbornene, 2-isopropenyl-5-norbornene and tricyclodienes, such as 3-methyltricyclo[5.2.1.0$^{2,6}$]-3,8-decadiene or mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM- and EPDM rubbers may preferably also be grafted with reactive carboxylic acids or derivatives of these. Examples of these are acrylic acid, methacrylic acid and derivatives thereof, e.g. glycidyl (meth)acrylate and maleic anhydride.

Another class of preferred rubbers is that of copolymers of ethylene with acrylic acid and/or methacrylic acid and/or with the esters of these acids. The rubbers may additionally comprise dicarboxylic acids, such as maleic acid and fumaric acid or derivatives of these acids, e.g. esters and anhydrides, and/or monomers containing epoxy groups. These dicarboxylic acid derivatives or monomers containing epoxy groups are preferably incorporated into the rubber by addition to the monomer mixture of monomers which have the formulae I, II, III or IV and contain dicarboxylic acid groups and/or epoxy groups

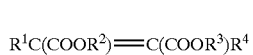 (I)

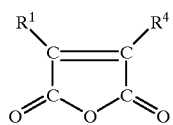 (II)

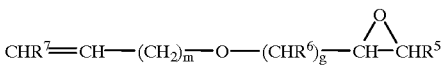 (III)

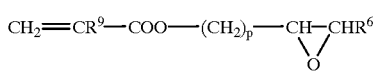 (IV)

where $R^1$ to $R^9$ are hydrogen or alkyl groups having from 1 to 6 carbon atoms and m is an integer from 0 to 20, g is an integer from 0 to 10 and p is an integer from 0 to 5.

The radicals $R^1$ to $R^9$ are preferably hydrogen, m is 0 or 1 and g is 1. The corresponding compounds are maleic acid, fumaric acid, maleicanhydride, allyl glycidyl ether and vinyl glycidyl ether.

Preferred compounds of the formulae I, II and IV are maleic acid, maleic anhydride and esters of acrylic acid and/or methacrylic acid containing epoxy groups, for example glycidyl acrylate, glycidyl methacrylate and the tertiary alcohol esters, such as tert-butyl acrylate. Although the latter have no free carboxyl groups, their behavior approximates to that of the free acids and they are therefore termed monomers with latent carboxyl groups.

The copolymers are advantageously composed of from 50 to 98% by weight of ethylene, from 0.1 to 20% by weight of monomers containing epoxy groups and/or of monomers containing anhydride groups, and the residual amount of (meth)acrylates.

Particular preference is given to copolymers made from 50 to 98% by weight, in particular from 55 to 95%, of ethylene, from 0.1 to 40% by weight, in particular from 0.3 to 20%, of glycidyl acrylate and/or glycidyl methacrylate, or (meth)acrylic acid and/or maleic anhydride, and from 1 to 45% by weight, in particular from 10 to 40% by weight, of n-butyl acrylate and/or 2-ethylhexyl acrylate.

Other preferred esters of acrylic and/or methacrylic acid are the methyl, ethyl, propyl, isobutyl and tert-butyl esters. Besides these, vinyl esters and vinyl ethers may also be used as comonomers.

The ethylene copolymers described above may be prepared by processes known per se, preferably by random copolymerization under high pressure and elevated temperature. Appropriate processes are well known.

Preferred elastomers include emulsion polymers, the preparation of which is described, for example, by Blackley in the monograph "Emulsion Polymerization". The emulsifier and catalysts which can be used are known per se.

It is possible in principle to use elastomers of homogeneous structure or else those with a shell structure. The shell-type structure is determined by the sequence of addition of the individual monomers; the morphology of the polymers is also influenced by this sequence of addition.

Monomers which may be mentioned here merely as examples for the preparation of the rubber portion of elastomer are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and other acrylates or methacrylates, such as methyl methacrylate, ethyl acrylate and propyl acrylate.

The soft or rubber phase (with a glass transition temperature of less than 0° C.) of the elastomers can be the core, the outer shell or an intermediate shell (in the case of elastomers whose structure has more than two shells);

multi-shell elastomers may also have more than one shell made from a rubber phase.

If the structure of the elastomer involves, besides the rubber phase, one or more hard components (with glass transition temperature above 20° C.) then these are generally prepared by polymerizing, as principal monomers, styrene, acrylonitrile, methacrylonitrile, α-methyl styrene, p-methyl styrene, acrylates or methacrylates, such as methyl acrylate, ethyl acrylate or methyl methacrylate. Besides these, it is also possible here to use relatively small proportions of other comonomers.

It has proven advantageous in some cases to use emulsion polymers which have reactive groups at their surfaces. Examples of such groups are epoxy, carboxyl, latent carboxyl, amino and amide groups, and also functional groups which may be introduced by concomitant use of monomers of the formula

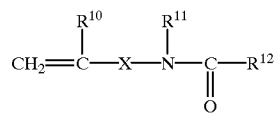

where the substituents may be as follows:

$R^{10}$ hydrogen or a $C_1$–$C_4$-alkyl group, $R^{11}$ hydrogen or a $C_1$–$C_8$-alkyl group or an aryl group, in particular phenyl, $R^{12}$ hydrogen, a $C_1$–$C_{10}$-alkyl or $C_6$–$C_{12}$-aryl group or —$OR^{13}$ $R^{13}$ a $C_1$–$C_8$-alkyl or $C_6$–$C_{12}$-aryl group, which may, if desired, be substituted with O- or N-containing groups, X a chemical bond, a $C_1$–$C_{10}$-alkylene or $C_6$–$C_{12}$-arylene group or

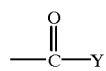

O—Z or NH—Z, and a $C_1$–$C_{10}$-alkylene or $C_6$–$C_{12}$-arylene group.

The graft monomers described in EP-A-0,208,187 are also suitable for introducing reactive groups at the surface.

Other examples which may be mentioned are acrylamide, methacrylamide and substituted esters of acrylic acid or methacrylic acid, such as N-tert-butylaminoethyl methacrylate, N,N-dimethylaminoethyl acrylate N,N-dimethylaminomethyl acrylate and N,N-diethylaminoethyl acrylate.

It is moreover possible for the particles of the rubber phase to be crosslinked. Examples of monomers acting as crosslinking agents are 1,3-butadiene, divinylbenzene, diallyl phthalate and dihydrodicyclopentadienyl acrylate, and also the compounds described in EP-A-0,050,265.

It is also possible to use graft-linking monomers, i.e. monomers having two or more polymerizable double bonds which react at different rates during the polymerization. Preference is given to the use of those compounds in which at least one reactive group polymerizes at about the same rate as the other monomers, while the other reactive group(s) polymerize(s) much more slowly. The different polymerization rates cause a certain proportion of unsaturated double bonds in the rubber. If another phase is then grafted onto a rubber of this type, the double bonds present in the rubber react at least to some extent with the graft polymonomers to form chemical bonds, i.e. the phase grafted on is at least to some extent linked via chemical bonds with the graft base.

Examples of such graft-linking monomers are monomers containing alkyl groups, in particular allyl esters of ethylenically unsaturated carboxylic acids, such as allyl acrylate, allyl methacrylate, diallyl maleate, diallyl fumarate, diallyl aconate and diallyl itaconate or the corresponding monoallyl compounds of these di- or tricarboxylic acids. Besides these, there is a wide variety of other suitable graft-linking monomers, and for further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers will be listed below. Mention will firstly be made here of graft polymers with a core and at least one outer shell and having the following structure.

| Type | Monomers for the core | Monomers for the shell |
|---|---|---|
| I | 1,3-Butadiene, isoprene, n-butyl acrylate, ethylhexyl acrylate or mixtures of these | Styrene, acrylonitrile, methyl methacrylate |
| II | As I but with concomitant use of crosslinking agents | As I |
| III | As I or II | n-Butyl acrylate, ethyl acrylate, methyl acrylate, 1,3-butadiene, isoprene, ethylhexyl acrylate |
| IV | As I or II | As I or III, but with concomitant use of monomers with reactive groups as described herein |
| V | Styrene, acrylonitrile, methyl methacrylate or mixtures of these | First shell made from monomers as described under I and II for the core, second shell as described under I or IV for the shell |

Instead of graft polymers with multi-shell structure, it is also possible to use homogeneous, i.e. single-shell, elastomers made from 1,3-butadiene, isoprene and n-butyl acrylate or copolymers of these. These products, too, may be prepared with concomitant use of crosslinking monomers or monomers with reactive groups.

Examples of preferred emulsion polymers are n-butyl acrylate/(meth)acrylic acid copolymers, n-butyl acrylate/glycidyl acrylate or n-butyl acrylate/glycidyl methacrylate copolymers, graft polymers with an inner core made from n-butyl acrylate or based on butadiene and with an outer shell made from the abovementioned copolymers, and copolymers of ethylene with comonomers which provide reactive groups.

The elastomers described may also be prepared by other conventional processes, e.g. by suspension polymerization.

Other preferred rubbers are polyurethanes, as described in EP-A-0,115,846; EP-A-0,115,847; EP-A-0,116,456; EP-A-0,117,664 and EP-A-0,327,384. Such products are commercially available, for example, under the designations Desmopan® (Bayer AG) or Elastollan® (Elastogran Polyurethane GmbH).

Silicone rubbers, as described in DE-A-3,725,576, EP-A-0,235,690, DE-A-3,800,603 and EP-A-0,319,290, are also preferred.

It is, of course, also possible to use mixtures of the rubber types listed above.

The novel molding compositions are prepared by mixing the starting components and then treating them under subatmospheric pressure at from 230 to 330° C., preferably from 250 to 300° C. Care should be taken here that from 0.9 to 1.2 mol of water is removed during the treatment per mole of aluminum hydroxide used.

The starting components are mixed in a manner known per se in conventional mixing apparatuses. The sequence of addition is not critical.

The mixture is then, preferably while being mixed, heated to a temperature of from 230 to 330° C., preferably from 250 to 300° C. The subatmospheric pressure may be applied as early as at the beginning of the heating procedure or else when the desired temperature has been achieved. The actual treatment can take place isothermally, but it is advantageous to run through a temperature program within the abovementioned range. The subatmospheric pressure to be applied is from 0.1 to 100 mbar, preferably from 0.5 to 50 mbar, in particular from 1 to 25 mbar.

The subatmospheric pressure is preferably adjusted in such a way that at least 0.9 mol, preferably from 0.9 to 1.2 mol, of water is removed from the mixture per mole of aluminum hydroxide used. The duration of treatment depends on the subatmospheric pressure selected and on the temperature. The treatment is usually regarded as completed when the abovementioned amount of water has been collected.

The treated molding composition is then cooled and preferably brought into contact with dry air and/or a dry inert gas and comminuted. The solidified melt cake has a particularly smooth surface.

If the abovementioned treatment takes place in an extruder or reactor with a connection to an extruder, then the treated molding composition may also be directly extruded.

The other additives may be added immediately after the treatment or else via mixing of the comminuted treated granules.

The high aluminum hydroxide content of the novel molding composition means that this can also be regarded as a concentrate. The novel molding composition may therefore also be mixed with other thermoplastic polyesters for further processing. The final product here essentially retains its flame retardancy.

The novel thermoplastic molding compositions have flame retardancy together with good mechanical and electrical properties. They are suitable for producing moldings, including fibers and films. The use of the novel molding composition for producing moldings, and also moldings comprising the novel molding composition, are therefore also provided by the invention.

EXAMPLE

Preparation of the Thermoplastic Molding Compositions 180 grams of polybutylene terephthalate (PBT) are heated under an inert gas (argon) to 260° C. 120 grams (1.538 mol) of aluminum hydroxide $Al(OH)_3$ are introduced little by little into the PBT melt with intensive mixing. A subatmospheric pressure of 20 mbar is then applied and the temperature of the suspension is raised to 285° C. Water which is eliminated is collected in a downstream cold trap. After a total of 35 minutes at 285° C. no further elimination of water was observed. 30.6 grams of water (pH 6.0) are collected in total. This corresponds to 1.1 mol of water per mole of $Al(OH)_3$.

The cold melt could be removed from the reactor without difficulty. The surface of the melt cake is particularly smooth and highly uniform.

The novel molding composition was subjected to a preliminary fire test with an open flame, the result of which showed the novel molding composition to be self-extinguishing.

What is claimed is:

1. A flame retardant thermoplastic polyester molding composition obtained by treating a mixture comprising from 60 to 90% by weight of a thermoplastic polyester and from 10 to 40% by weight of aluminum hydroxide at from 230 to 330° C. at subatmospheric pressure, where from 0.9 to 1.2 mole of water is removed per mole of aluminum hydroxide used.

2. The polyester molding composition as claimed in claim 1, wherein the thermoplastic polyester is polyethylene terephthalate, polyethylene naphthalate, polypropylene terephthalate, polybutylene terephthalate or a mixture of these.

3. The polyester molding composition as claimed in claim 1, which further comprises from 0 to 2% by weight of fluorine-containing ethylene polymers.

4. The polyester molding composition as claimed in claim 1, which further comprises from 0 to 40% by weight of fibrous or particulate fillers or mixtures of these, where the fibrous or particulate fillers are not, and do not comprise, aluminum hydroxide.

5. The polyester molding composition as claimed in claim 4, wherein the fillers used are stabilizers, oxidation inhibitors, agents protecting against thermal decomposition, colorants, fibrous and pulverulent fillers, fibrous and pulverulent reinforcing materials, crystallization accelerators, nucleating agents or plasticizers.

6. The polyester molding composition as claimed in claim 1 which further comprises from 0 to 60% by weight of an elastomeric polymer.

7. The polyester molding composition as claimed in claim 1, wherein the treatment takes place at temperatures of from 250 to 300° C.

8. A method of producing a molded article which comprises using the polyester molding composition as claimed in claim 1.

9. A molding comprising the polyester molding composition as claimed in claim 1.

10. The molding as claimed in claim 9, wherein the molded articles are fibers or films.

11. The polyester molding composition according to claim 4, wherein a colorant is present in an amount not to exceed 25 % by weight and said colorant is a dye or a pigment.

12. The polyester molding composition as claimed in claim 1, which further comprises a fluorine-containing ethylene polymer as being present in an amount not to exceed 2 % by weight wherein said polymers have a fluorine content from 55 to 76% by weight.

13. The polyester molding composition as claimed in claim 12, wherein the fluorine content is from 70 to 76% by weight.

14. The polyester molding composition as claimed in claim 1, which further comprises fibrous or particulate fillers or mixtures of these, where the fibrous or particulate fillers are and do not contain aluminum hydroxide and are present in an amount not to exceed 40% by weight based on the weight of the molding composition.

15. The polyester molding composition as claimed in claim 13, which further comprises fibrous or particulate fillers or mixtures of these, where the fibrous or particulate fillers are and do not contain aluminum hydroxide and are present in an amount not to exceed 40% by weight based on the weight of the molding composition.

16. The polyester molding composition as claimed in claim 1, which further comprises an elastomeric polymer being present in an amount not to exceed 40% by weight based on the weight of the molding composition.

17. The polyester molding composition as claimed in claim 15 which further comprises elastomeric polymers being present in an amount not to exceed 40% by weight based on the weight of the molding composition.

18. The polyester molding composition as claimed in claim 1, which further comprises UV stabilizers to be present in an amount not to exceed 2% by weight based on the weight of the molding composition.

19. A polyester molding composition as claimed in claim 17, which further comprises UV stabilizers to be present in an amount not to exceed 2% by weight based on the molding composition.

20. The polyester molding composition as claimed in claim 18, wherein said impact modified polymer is ethylene-propylene rubbers (EPM) or ethylene-propylene diene rubbers (EPDM).

21. A process to produce a flame-retardant thermoplastic polyester molding composition which comprises heat treating a mixture comprising 60 to 90% by weight of a thermoplastic polyester and from 10 to 40% by weight of aluminum hydroxide at from 230 to 330° C. at subatmospheric pressure and removing from 0.9 to 1.2 mole of water per mole of aluminum hydroxide used.

* * * * *